(12) United States Patent
Van Druten et al.

(10) Patent No.: US 8,696,508 B2
(45) Date of Patent: Apr. 15, 2014

(54) DRIVE MECHANISM

(71) Applicant: DTI Group, B.V., Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 13/905,541

(22) Filed: May 30, 2013

(65) Prior Publication Data

US 2013/0260937 A1 Oct. 3, 2013

Related U.S. Application Data

(63) Continuation of application No. PCT/NL2011/050823, filed on Nov. 30, 2011.

(51) Int. Cl.
*F16H 3/72* (2006.01)
*F16H 37/06* (2006.01)
*B60K 6/442* (2007.10)
*B60K 6/445* (2007.10)

(52) U.S. Cl.
USPC ......... 475/5; 475/4; 475/6; 180/65.235; 180/65.23

(58) Field of Classification Search
USPC ............ 475/1–10; 180/65.235, 65.23, 65
See application file for complete search history.

(56) References Cited

U.S. PATENT DOCUMENTS

| | | | | | |
|---|---|---|---|---|---|
| 3,870,116 | A | * | 3/1975 | Seliber | 180/165 |
| 3,923,115 | A | * | 12/1975 | Helling | 180/65.25 |
| 4,411,171 | A | * | 10/1983 | Fiala | 475/5 |
| 4,525,661 | A | * | 6/1985 | Mucsy et al. | 322/4 |
| 4,588,040 | A | * | 5/1986 | Albright et al. | 180/165 |
| 5,569,108 | A | * | 10/1996 | Cadee et al. | 475/1 |
| 5,928,098 | A | * | 7/1999 | Imamura et al. | 475/81 |
| 6,573,626 | B1 | * | 6/2003 | Gosebruch et al. | 310/74 |
| 6,784,562 | B2 | * | 8/2004 | Gennesseaux | 290/2 |
| 2007/0049443 | A1 | * | 3/2007 | Schmidt | 475/5 |
| 2007/0219038 | A1 | * | 9/2007 | Druten et al. | 475/210 |

FOREIGN PATENT DOCUMENTS

| | | |
|---|---|---|
| DE | 202007015050 | 1/2008 |
| WO | WO 2007043875 | 4/2007 |
| WO | WO 2008154752 | 12/2008 |
| WO | WO 2009010819 | 1/2009 |
| WO | WO 2010082079 | 7/2010 |

* cited by examiner

*Primary Examiner* — Tisha Lewis
(74) *Attorney, Agent, or Firm* — Eric Karich

(57) ABSTRACT

A drive mechanism has a drive source which is connected by a main clutch to a transmission which is connected to wheels of the vehicle. The drive mechanism further includes two hybrid modules of which a first module is connected to the drive source and the second module is connected between the transmission and the wheels to the drive line. The first hybrid module has a flywheel and a flywheel clutch and the second hybrid module has a motor/generator and a further clutch.

20 Claims, 2 Drawing Sheets

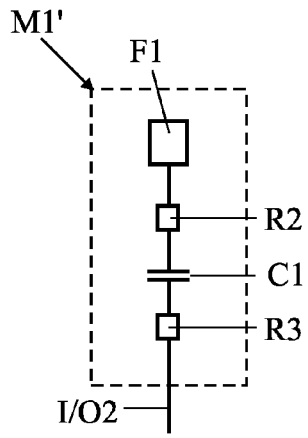
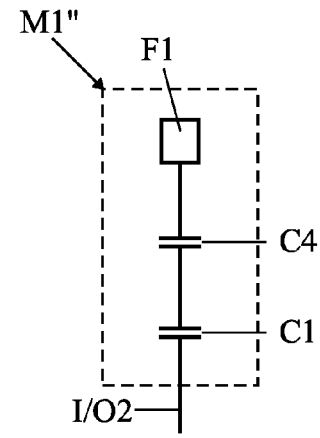
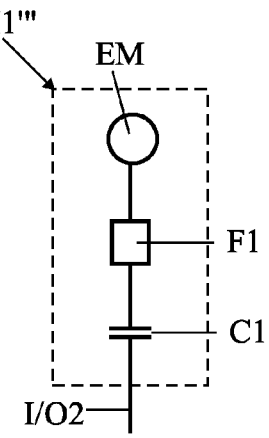
FIG. 3   FIG. 4   FIG. 5
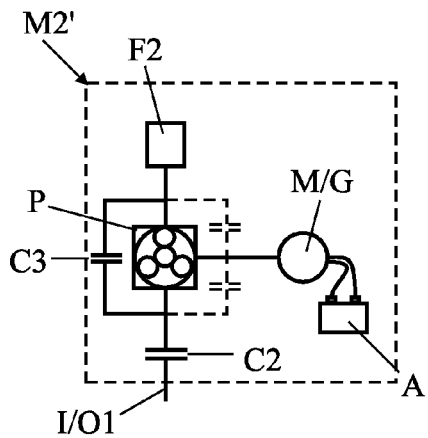
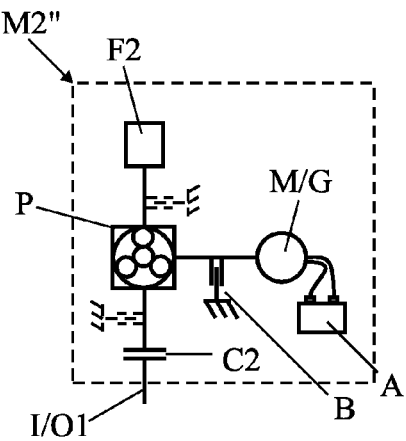
FIG. 6   FIG. 7
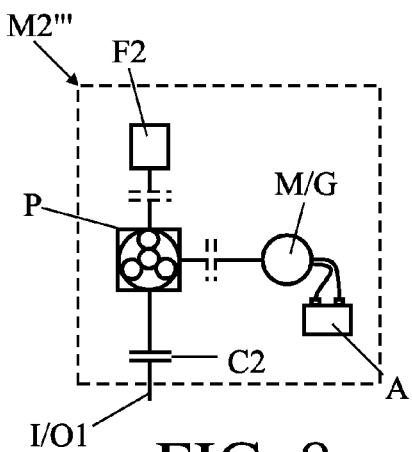
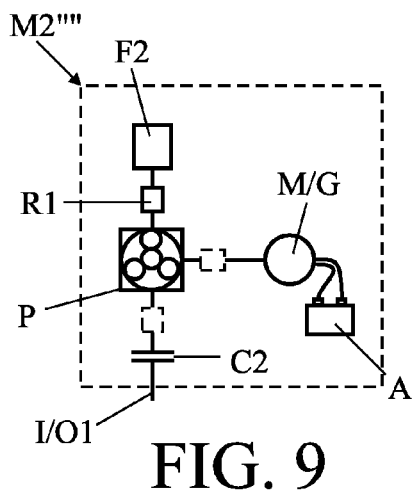
FIG. 8   FIG. 9

DRIVE MECHANISM

CROSS-REFERENCE TO RELATED APPLICATIONS

This application for a utility patent is a continuation of a previously filed application, now abandoned, having the application number PCT/NL2011/050823, filed 30 Nov. 2011. This application also claims the benefit of Netherlands application NL2005791, filed 30 Nov. 2010.

FIELD OF THE INVENTION

The invention relates to a drive mechanism for a vehicle provided with at least two wheels, and more particularly to a drive mechanism that includes a hybrid module having a flywheel.

STATE OF THE ART

Deshaies, U.S. 2010/193270, teaches a hybrid electric propulsion system for a vehicle. The system includes an internal combustion engine; a flywheel operatively connected to the engine, the flywheel having a horizontal rotation axis parallel to a rotation axis of the wheels of the vehicle, the flywheel having a main disk being rotatable in an opposite direction ($R_{FES}$) with respect to a rotation of the wheels ($R_T$) of the vehicle when the vehicle is travelling forward so as to inhibit a rollover effect of the vehicle when the vehicle is turning; an electric generator operatively connected to the flywheel; an electric motor operatively connected to the electric generator; and a controller for controlling operation of the engine, the flywheel, the electric generator and the electric motor.

SUMMARY OF THE INVENTION

The invention relates to a drive mechanism for a vehicle provided with at least two wheels, comprising:
 a drive source which is connected to the wheels via a drive line,
 a clutch present in the drive line between the drive source and the wheels, and
 a first hybrid module comprising:
  an input/output which is connected to the drive source directly or via a node that is present between the clutch and the drive source,
  a flywheel which is connected to the input/output, and
  a clutch which is present between the flywheel and the input/output.

The input/output may in this case be connected to the distribution system side or the flywheel side of the combustion engine and the drive source may be, for example, a combustion engine.

It is an object of the invention to provide a drive line of the type defined in the opening paragraph in which higher efficiency of the drive line can be achieved at lower cost.

For this purpose the drive line according to the invention is characterized in that the drive mechanism further includes:
 a second hybrid module which is provided with:
  a further input/output which is connected to the wheels or to the drive line via a node that is present between the clutch and the wheels,
  a motor/generator which is connected to the further input/output, and
  energizing means which are connected to the motor/generator.

By providing the drive line with a specific combination of two hybrid modules that can run both individually and in conjunction with each other it is possible to achieve higher efficiency of the drive line. Furthermore, the specific combination of hybrid modules is advantageous in that the requirements made on the individual modules are less strict causing the overall cost of the drive line to be lower.

The drive mechanism according to the invention may further include a transmission which is present in the drive line between the clutch and the wheels. In that case an embodiment of the drive line according to the invention is characterized in that the second hybrid module with its further input/output is connected to the transmission. The further input/output may in that case be connected to the primary shaft or secondary shaft of the transmission, or to the transmission at a location between the primary and the secondary shaft.

The motor/generator may be arranged either electrically, hydraulically or pneumatically, so may comprise an electromotor/generator or hydromotor/pump or air motor/pump.

The clutch is preferably arranged as a dry plate friction clutch, but may also be arranged as an epicyclic gearing where a third rotational member is connected to a dry plate friction brake.

By opening the clutch (during driving), the combustion engine can be switched off so that the braking energy can be regained when the motor/generator is energized, or the vehicle can be driven by energy from an accumulator (energizing means) which is coupled to the motor/generator.

By subsequently closing the flywheel clutch (during driving), the drive source (combustion engine) can quickly be restarted by the energy from the flywheel. The power produced by the flywheel during this action need not be produced by the second hybrid module then, so that the latter may be of a lighter, smaller, more compact or more cost-effective design.

A further embodiment of the drive line according to the invention is characterized in that an epicyclic gearing is arranged between the motor/generator of the second hybrid module and the further input/output, which epicyclic gearing comprises at least three rotational members, a first rotational member of which is connected to the further input/output, a second rotational member of which is connected to the motor/generator and a third rotational member of which is connected to a further flywheel.

The first hybrid module may be connected to the drive source by means of a drive belt forming part of the drive source, or by means of a separate belt, chain or gear transmission on the distribution system side.

In lieu of this the first hybrid module may also be connected on the flywheel side to the drive source by means of a flywheel ring gear forming part of the drive source or by means of a separate gear that is attached to a motor gear forming part of the drive source (in the case of a dual mass flywheel on one of the two motor flywheels) or is attached to the housing of a torque converter connected on the flywheel side to the drive source.

The second hybrid module can be directly connected to the front or rear wheels. However, the drive mechanism preferably comprises a differential by means of which the second hybrid module is connected to the wheels, while the drive source is connected to the wheels by means of this differential or a further differential.

The second hybrid module may be connected to the primary shaft of the transmission by means of a gear already connected to the primary shaft or by means of a separate chain, belt or gear transmission.

In lieu of this the second hybrid module may be connected to the transmission via a node by means of a gear or gears forming part of the transmission, which gear or gears is or are connected to an intermediate shaft of the transmission or by means of a separate chain, belt or gear transmission.

Again in lieu of this the second hybrid module can be connected to the secondary shaft of the transmission by means of a gear already connected to the secondary shaft or by means of a separate chain, belt or gear transmission.

Yet a further embodiment of the drive line according to the invention is characterized in that the first hybrid module comprises a flywheel clutch which is present between the flywheel and the input/output.

Further advantageous embodiments are characterized in that the first hybrid module further includes an auxiliary clutch which is present between the flywheel and the flywheel clutch, or in that the first hybrid module further includes at least one reduction gear unit which is present between the flywheel and the flywheel clutch and/or between the flywheel clutch and the input/output, or in that the first hybrid module further includes an electromotor which is connected to the flywheel.

The second hybrid module further preferably includes a further flywheel which is present between the motor/generator and the further input/output, as well as an epicyclic gearing comprising at least three rotational members, a first rotational member of which is connected to the further input/output, a second rotational member of which is connected to the motor/generator and a third rotational member of which is connected to the further flywheel.

The epicyclic gearing may be arranged as a planetary gear set, a frictional contact drive, a planetary gear set, or a magnetic planetary gear set. Furthermore, the epicyclic gearing may (partly) be manufactured in plastic to reduce cost.

Again a further embodiment of the drive line according to the invention is characterized in that the second hybrid module comprises a further clutch which is present between the motor/generator and the further input/output.

Further advantageous embodiments are characterized in that the second hybrid module comprises a short-circuit clutch which is present between two of the three rotational members, or in that the second hybrid module comprises a brake which is connected to one of the rotational members, or in that the second hybrid module comprises a reduction gear unit which is present between one of the rotational members and the connected motor/generator or further clutch or further flywheel.

The further clutch may also be present between the second rotational member and the motor/generator or between the third rotational member and the further flywheel.

BRIEF DESCRIPTION OF THE DRAWINGS

The invention will be described below in more detail based on an example of embodiment of the drive mechanism according to the invention represented in the drawing figures, in which:

FIGS. 3, 4 and 5 give diagrammatic representations of different embodiments of the first hybrid module; and FIGS. 6, 7, 8 and 9 give diagrammatic representations of different embodiments of the second hybrid module.

DETAILED DESCRIPTION OF THE DRAWINGS

Figure 1:
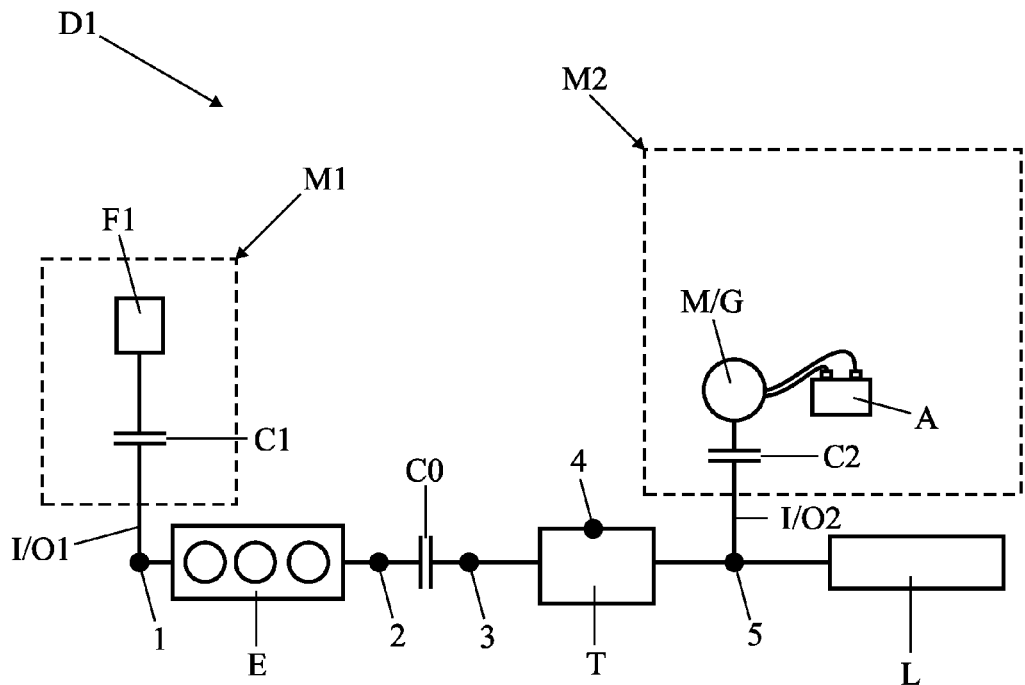
FIGS. 1 and 2 give a diagrammatic representation of a first or second embodiment respectively of the drive mechanism according to the invention.

FIG. 1 gives a diagrammatic representation of a first embodiment of the drive mechanism according to the invention present in a vehicle. The drive mechanism D1 comprises a drive source E, arranged as a combustion engine, which is connected by means of a main clutch C0 to a transmission T which is connected to the wheels L of the vehicle. There may also be a second node 2 located on either side of the main clutch C0. The drive mechanism D1 further includes two hybrid modules. A first module M1 which has an input/output I/O1 on the distribution system side, where there may be a node 1 that is connected to the drive source E. There may also be a second module M2 with a further input/output I/O2 connected via a secondary shaft 5 located between the transmission T and the wheels L and is connected to the drive line. The main clutch C0 is arranged as a dry plate friction clutch (shown in the drawing figures), but may also be arranged as an epicyclic gearing of which one of the rotational members is connected to a dry plate friction brake (not shown in the drawing figures).

The first hybrid module M1 comprises a flywheel F1 and a fly and a flywheel clutch C1 by means of which the flywheel can be connected to the input/output. The second hybrid module M2 comprises a motor/generator M/G and a further clutch C2 by means of which the motor/generator is connected to the further input/output. The motor/generator may be a PM machine (permanent magnet electromotor) having an inner or outer rotor or a claw pole motor or switch-reluctance motor, which can be driven both as a motor and as a generator. The motor/generator may also be a hydromotor/generator which is coupled to an oil pump which in its turn is coupled to the drive line. Furthermore, the second hybrid module M2 includes energizing means A connected to the motor/generator. These energizing means are formed by a battery and power electronics which connect the battery to the motor/generator. The battery also provides the power supply to auxiliaries in the vehicle. The power electronics may be integrated with the housing of the motor/generator or be installed close to the housing. The battery, which is connected to the motor/generator, may be the 12V battery already present in the vehicle and which provides the power supply to the auxiliaries, or may be a separate battery (12V, 24V, 36V, 48V or upwards) which may or may not be coupled electrically to the 12V battery already present).

Figure 2:
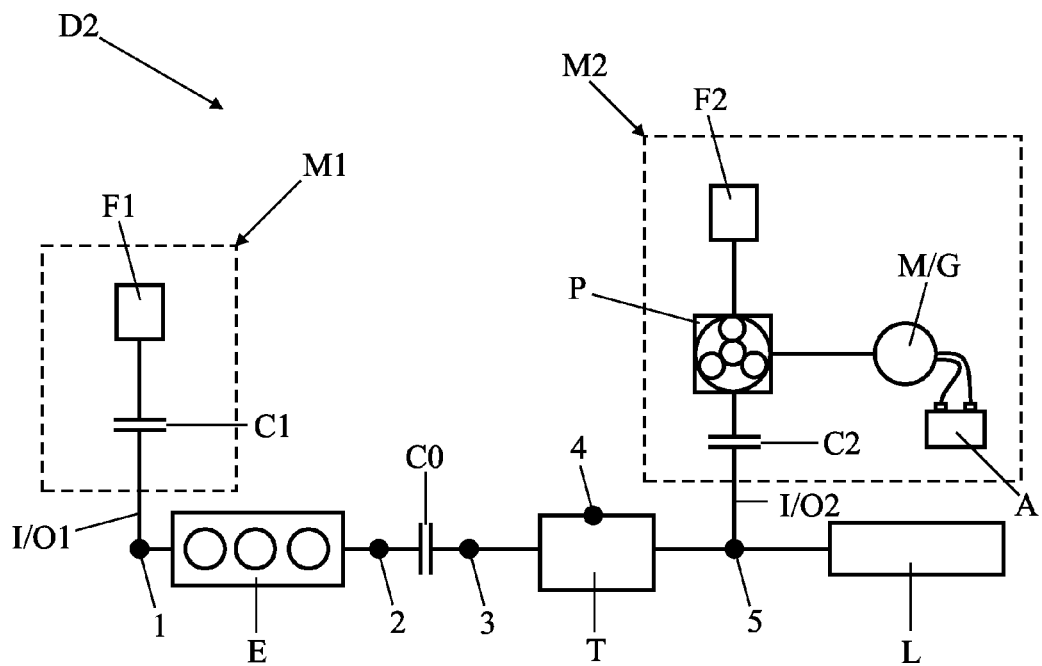

FIG. 2 gives a diagrammatic representation of a second embodiment of the drive mechanism according to the invention. This drive mechanism D2 differs from the drive mechanism represented in FIG. 1 in that the second hybrid module M2 further includes an epicyclic gearing P which is present between the motor/generator M/G and the further input/output I/O2, and a further flywheel F2 connected to this epicyclic gearing. The epicyclic gearing P comprises three rotational members, a first rotational member of which is connected to the further input/output I/O2, a second rotational member is connected to the motor/generator M/G and a third rotational member is connected to the further flywheel F2.

By opening the main clutch C0 (during driving), the braking energy can be regained by energizing the motor/generator M/G (the combustion engine may then be turned off), or the vehicle in which the drive line is present can be driven by energy from an accumulator which is coupled to the motor/generator and/or the further flywheel F2 that is coupled to the motor/generator. By subsequently closing the flywheel clutch C1 between the flywheel F1 and the drive source (during driving), the drive source (combustion engine) can be restarted with the energy coming from the flywheel F1.

The first hybrid module M1 is connected to the drive source E by means of a drive belt forming part of the drive source E, or by means of a separate belt, chain or gear transmission on the distribution system side 1. In lieu of this the first hybrid module M1 may be connected on the flywheel side to the drive source by means of a flywheel ring gear forming part of the drive source E or by means of a separate gear that is attached to motor flywheel forming part of the drive source or attached to the housing of a torque converter connected on the flywheel side to the drive source.

The second hybrid module M2 is connected to the secondary shaft 5 of the transmission T by means of a gear already connected to the secondary shaft or by means of a separate chain, belt or gear transmission. In lieu of this the second hybrid module M2 may also be connected to the primary shaft 3 of the transmission T by means of a gear already connected to the primary shaft or by means of a separate chain, belt or gear transmission or via a node 4 by means of a gear or gears forming part of the transmission which gear or gears is/are connected to an intermediate shaft of the transmission or by means of a separate chain, belt or gear transmission.

The first or second drive mechanism D1 or D2 may further include a differential by means of which the second hybrid module M2 is connected to the wheels, while the drive source is connected to the wheels by means of this differential or a further differential.

Between the flywheel F1 and the flywheel clutch C1 of the first hybrid module M1 may be present a reduction gear unit R2, see FIG. 3, and between the flywheel clutch C1 and the input/output I/O may be present a reduction gear unit R3. Furthermore, the first hybrid module M1 may comprise an auxiliary clutch C4, see FIG. 4, which is present between the flywheel F1 and the flywheel clutch C1. The first hybrid module M1 may also comprise an electromotor EM which is connected to the flywheel F1, see FIG. 5.

The second hybrid module M2 may further include a short-circuit clutch C3 which is present between two of the three rotational members, see FIG. 6, or a brake B which is connected to one of the rotational members, see FIG. 7. In addition, the further clutch C2 may be present between the second rotational member and the motor/generator M/G or between the third rotational member and the further flywheel F2, see FIG. 8. The second hybrid module M2 may also comprise a reduction gear unit R1 which is present between one of the rotational members and the connected motor/generator or further clutch or further flywheel, see FIG. 9.

Albeit the invention has been described in the foregoing based on the drawings, it should be observed that the invention is not by any manner or means restricted to the embodiment shown in the drawings. The invention also extends to all embodiments deviating from the embodiment shown in the drawings within the spirit and scope defined by the claims.

What is claimed is:

1. A drive mechanism for a vehicle provided with at least two wheels, the drive mechanism comprising:
   a drive source which is connected to the wheels via a drive line;
   a main clutch present in the drive line between the drive source and the wheels;
   a first hybrid module comprising:
      an input/output which is exclusively connected to the drive source directly;
      a flywheel which is connected to the input/output; and
      an flywheel clutch which is present between the flywheel and the input/output; and
   wherein the drive mechanism further includes a second hybrid module comprising:
      a further input/output which is exclusively connected to the wheels between a further clutch and the wheels;
      a motor/generator which is connected to the further input/output; and
      an energizing means which are connected to the motor/generator.

2. The drive mechanism of claim 1, wherein the drive mechanism comprises a transmission which is present in the drive line between the main clutch and the wheels.

3. The drive mechanism of claim 2, wherein the second hybrid module with its further input/output is connected to the transmission.

4. A drive mechanism for a vehicle provided with at least two wheels, the drive mechanism comprising:
   a drive source which is connected to the wheels via a drive line;
   a clutch present in the drive line between the drive source and the wheels;
   a first hybrid module comprising:
      an input/output which is exclusively connected to the drive source directly;
      a flywheel which is connected to the input/output; and
      a clutch which is present between the flywheel and the input/output; and
   wherein the drive mechanism further includes a second hybrid module comprising:
      a further input/output which is connected to the wheels or to the drive line via a node that is present between a further clutch and the wheels;
      a motor generator which is connected to the further input/output; and
      an energizing means which are connected to the motor/generator;
   wherein an epicyclic gearing is arranged between the motor/generator of the second hybrid module and the further input/output, which epicyclic gearing comprises at least three rotational members, a first rotational member of which is connected to the further input/output, a second rotational member of which is connected to the motor/generator, and a third rotational member of which is connected to a further flywheel.

5. The drive mechanism of claim 1, wherein the first hybrid module is connected to the drive source by means of a drive belt forming part of the drive source, or with a separate belt, chain or gear transmission on the distribution system side.

6. The drive mechanism of claim 1, wherein the first hybrid module is connected on the flywheel side to the drive source by means of a flywheel ring gear forming part of the drive source or by means of a separate gear that is attached to a motor flywheel forming part of the drive source, or is attached to the housing of a torque converter connected on the flywheel side to the drive source.

7. The drive mechanism of claim 1, wherein the second hybrid module is connected to a primary shaft of the transmission by means of a gear already connected to the primary shaft or with a separate chain, belt or gear transmission.

8. The drive mechanism of claim 1, wherein the second hybrid module is connected to the transmission via a node with a gear or gears forming part of the transmission which is or are connected to an intermediate shaft of the transmission or with a separate chain, belt or gear transmission.

9. The drive mechanism of claim 1, wherein the second hybrid module is connected to the secondary shaft of the transmission with a gear already connected to the secondary shaft or with a separate chain, belt or gear transmission.

10. The drive mechanism of claim 1, wherein the drive mechanism further comprises a differential with which the second hybrid module is connected to the wheels, while the drive source is connected to the wheels with this differential or a further differential.

11. The drive mechanism of claim 1, wherein the first hybrid module comprises a flywheel clutch which is present between the flywheel and the input/output.

12. The drive mechanism of claim 11, wherein the first hybrid module further includes an auxiliary clutch which is present between the flywheel and the flywheel clutch.

13. The drive mechanism of claim 11, wherein the first hybrid module further includes at least one reduction gear unit which is present between the flywheel and the flywheel clutch and/or between the flywheel clutch and the input/output.

14. The drive mechanism of claim 11, wherein the first hybrid module further includes an electromotor which is connected to the flywheel.

15. The drive mechanism of claim 1, wherein the energizing means of the second hybrid module comprise a battery as well a power electronics connecting the battery to the motor/generator.

16. The drive mechanism of claim 1, wherein the energizing means of the second hybrid module comprise a battery which is connected to the motor/generator and also provides the power supply to auxiliaries in the vehicle.

17. The drive mechanism of claim 1, wherein the second hybrid module comprises a further clutch which is present between the motor/generator and the further input/output.

18. A drive mechanism for a vehicle provided with at least two wheels, the drive mechanism comprising:
  a drive source which is connected to the wheels via a drive line;
  a clutch present in the drive line between the drive source and the wheels;
  a first hybrid module comprising:
    an input/output which is exclusively connected to the drive source directly;
    a flywheel which is connected to the input/output; and
    a clutch which is present between the flywheel and the input/output; and
  wherein the drive mechanism further includes a second hybrid module comprising:
    a further input/output which is connected to the wheels or to the drive line via a node that is present between a further clutch and the wheels;
    a motor/generator which is connected to the further input/output; and
    an energizing means which are connected to the motor/generator;
  wherein the second hybrid module includes a further flywheel which is present between the motor/generator and the further clutch, as well as an epicyclic gearing comprising at least three rotational members, a first rotational member of which is connected to the further clutch, a second rotational member is connected to the motor/generator and a third rotational member is connected to the further flywheel.

19. The drive mechanism of claim 18, wherein the second hybrid module comprises a short-circuit clutch which is present between two of the three rotational members.

20. The drive mechanism of claim 18, wherein the second hybrid module comprises a brake which is connected to one of the rotational members.

* * * * *